United States Patent
Cherchi et al.

(10) Patent No.: US 11,175,454 B2
(45) Date of Patent: Nov. 16, 2021

(54) LIGHT ESCALATORS IN OPTICAL CIRCUITS BETWEEN THICK AND THIN WAVEGUIDES

(71) Applicant: Teknologian tutkimuskeskus VTT Oy, Espoo (FI)

(72) Inventors: Matteo Cherchi, VTT (FI); Timo Aalto, VTT (FI); Sanna Arpiainen, VTT (FI)

(73) Assignee: Teknologian tutkimuskeskus VTT Oy, Espoo (FI)

( * ) Notice: Subject to any disclaimer, the term of this patent is extended or adjusted under 35 U.S.C. 154(b) by 0 days.

(21) Appl. No.: 16/605,239

(22) PCT Filed: Apr. 23, 2018

(86) PCT No.: PCT/FI2018/050287
§ 371 (c)(1),
(2) Date: Oct. 15, 2019

(87) PCT Pub. No.: WO2018/193167
PCT Pub. Date: Oct. 25, 2018

(65) Prior Publication Data
US 2020/0124795 A1    Apr. 23, 2020

Related U.S. Application Data

(60) Provisional application No. 62/488,101, filed on Apr. 21, 2017.

(51) Int. Cl.
*G02B 6/122* (2006.01)
*G02B 6/12* (2006.01)

(52) U.S. Cl.
CPC .. *G02B 6/1228* (2013.01); *G02B 2006/12061* (2013.01); *G02B 2006/12138* (2013.01);
(Continued)

(58) Field of Classification Search
CPC ........ G02B 6/1228; G02B 2006/12061; G02B 2006/1213; G02B 2006/12138; G02B 2006/12142; G02B 2006/12147
See application file for complete search history.

(56) References Cited

U.S. PATENT DOCUMENTS 10,884,313 B2 *   1/2021   Gould ................. G02B 6/3508
2003/0223671 A1   12/2003  Morse
(Continued)

FOREIGN PATENT DOCUMENTS

| CN | 102047158 A | 5/2011 |
| EP | 1297369 B1 | 9/2006 |
| JP | 2014192472 A | 10/2014 |

OTHER PUBLICATIONS

Kim et al: Electroabsorption modulator based on inverted-rib-type silicon waveguide including double graphene layers. Journal of Optics, Institute of Physics Publishing, Mar. 9, 2017, vol. 19, No. 4, p. 45804.

*Primary Examiner* — Thomas A Hollweg
*Assistant Examiner* — Mary A El-Shammaa
(74) *Attorney, Agent, or Firm* — Laine IP Oy

(57) ABSTRACT

The invention relates to photonic circuits, in particular to photonic circuits where light is escalated transferred between optical waveguides which are coupled to photonic devices. A first waveguide on a silicon substrate is provided having a first thickness and a first refractive index. A tapered second waveguide having a second thickness less than the first thickness and a second refractive index higher than said first refractive index is deposited on the first waveguide. At least one layer of an optically active material comprising a photonic device is deposited on the first waveguide adjacent to the second waveguide. The photonic device is interfaced with the wide end of the tapered second waveguide to provide an optical coupling, and the opposite narrow end of
(Continued)

the tapered second waveguide is interfaced on top of the first waveguide to provide adiabatic light transfer between said first and second waveguides.

20 Claims, 6 Drawing Sheets

(52) U.S. Cl.
CPC ............ *G02B 2006/12142* (2013.01); *G02B 2006/12147* (2013.01)

(56) References Cited

U.S. PATENT DOCUMENTS

| | | |
|---|---|---|
| 2004/0202440 A1 | 10/2004 | Gothoskar et al. |
| 2012/0207424 A1 | 8/2012 | Zheng et al. |
| 2013/0101247 A1 | 4/2013 | Cho et al. |
| 2013/0285184 A1 | 10/2013 | Li |
| 2014/0044391 A1 | 2/2014 | Iizuka et al. |
| 2015/0316720 A1 | 11/2015 | Yang et al. |
| 2015/0346429 A1 | 12/2015 | Lambert et al. |
| 2016/0131837 A1 | 5/2016 | Mahgerefteh et al. |

\* cited by examiner

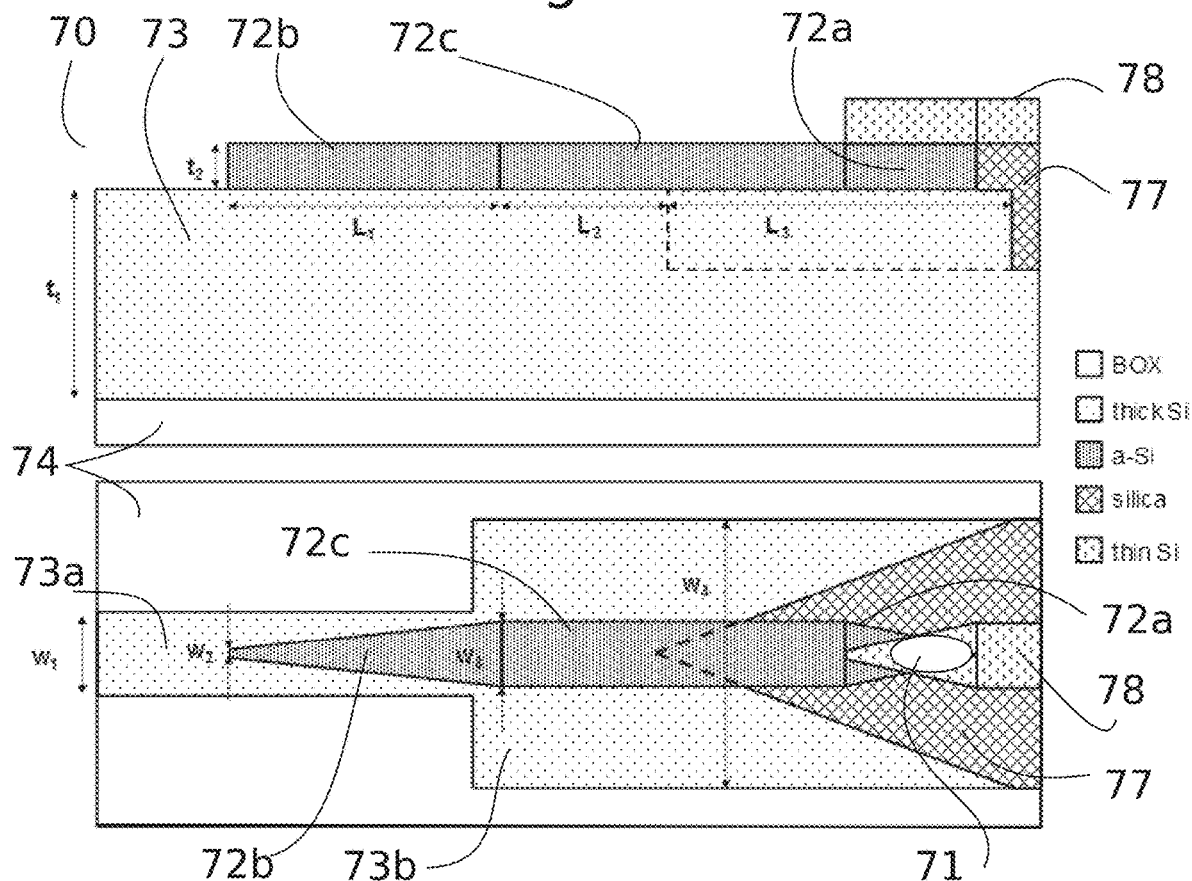
Fig. 7A
Fig. 7B
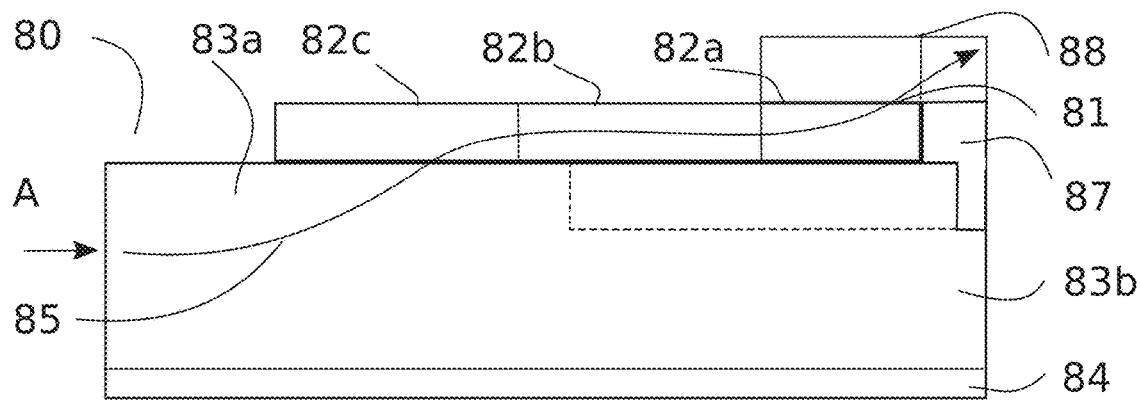
Fig. 8

LIGHT ESCALATORS IN OPTICAL CIRCUITS BETWEEN THICK AND THIN WAVEGUIDES

FIELD OF THE INVENTION

The invention relates to photonic circuits and their manufacture, in particular to photonic circuits where light is transferred between optical waveguides, which are coupled to photonic devices.

BACKGROUND OF THE INVENTION

Optical communication systems are continuously being miniaturized to integrate a large number of previously discrete optoelectronic devices with silicon-based integrated circuits to achieve on-chip optical interconnects for high performance computation. In particular, silicon photonics aims to integrate as many as possible optoelectronic functionalities based on CMOS compatible materials, in order to lower the cost without sacrificing performance.

Optical modulators and photodetectors are main building blocks of photonic systems. These two types of devices operate based on very different mechanisms and consequently utilize different device geometries. They often have to be made of different materials that are difficult and costly to integrate with silicon photonics. Optical modulators are based on electro-optical or electro-absorptive effects in materials such as $LiNbO_3$, germanium and compound semiconductor heterostructures. In silicon photonics, the dispersion effect induced by carrier injection or depletion is the most common method used to achieve integrated optical modulation, both in amplitude and phase. Typically this requires several millimeter long devices, but amplitude modulation can be also achieved with micron-scale devices, based on the Franz-Keldysh effect in SiGe compounds.

At the receiving end of optical links, photodetectors convert light back into electrical signals by absorbing photons and generating charges through photo-electric effects. Therefore, strong absorption and effective collection of photo-excited carriers are desired for efficient photo-detection. Because of these distinctive requirements, to date no device that can function as both a photodetector and a modulator, and whose role can be switched through external control, has been made with a single type of material. Such a simple yet multifunctional device, if implemented, not only can make integrated optical systems programmable and adaptable, but also can lead to novel applications such as optoelectronic oscillators and new schemes of optical computation and signal processing.

Because of its two-dimensional structure, graphene is ideally suited for integration with planar photonic devices and the performance of the devices benefits significantly from the elongated optical interaction length in coplanar configuration. With its remarkable optical and electrical properties, including absorption and dispersion, graphene has been exploited as a multifunctional optoelectronic material to produce, for example, highly tunable optoelectronic devices with high performance and adaptive controllability by electrostatic gating or chemical doping. Such devices include photodetectors, optical modulators, polarizers and saturable absorbers. Graphene optical modulators have been demonstrated to have very high speed (to date only limited by the RC constant of the electrodes) and very low energy consumption.

Indeed, graphene has been demonstrated to perform as a modulator on thin SOI waveguides with theoretical modulation speed of 800 GHz which would be far beyond other technological platforms used e.g. in optical switches in data centres. The problem to be solved is how to structure and fabricate graphene modulators on thick SOI waveguides, so that the graphene is interacting with the optical field.

Photonics circuits based on micron-scale (3 μm thick) silicon-on-insulator (SOI) waveguides have many advantages compared to standard submicron (220 nm-400 nm thick) silicon waveguide technology, but also some major limitations. Namely larger waveguide size implies devices with larger power consumption and, even more importantly, slower speed. This makes this thicker platform less attractive compared to others for most applications requiring high speed modulation and detection.

Prior art solutions to the problem include the use of submicron silicon waveguides for the whole circuit, which comes with many drawbacks, including high propagation losses, single-polarization operation, bad tolerances to fabrication errors, not to mention the requirement for very expensive deep UV fabrication tools. Fast devices have been demonstrated on thick SOI waveguides, where the volume of the devices was reduced by patterning sub-micron wide waveguides with a high aspect ratio, which makes the fabrication challenging and with a bad impact on yield. Only some types of fast detectors and modulators have been demonstrated with this approach, and no broadband modulators or phase modulators.

It is an object of the present invention to create an interface between micro-scale waveguides and submicron waveguides, in order to exploit the advantages of both technologies. One of the advantages of submicron waveguides is that they interact much better with graphene layers. Important other advantages include the possibility to fabricate fast Ge detectors and SiGe Franz-Keldysh modulators.

The present invention aims to make the micron-scale SOI platforms more attractive in the implementation of photonic circuits, by changing the mode size into the submicron scale only when fast modulation and detection is needed, while keeping the advantages of micron-scale waveguides elsewhere

SUMMARY OF THE INVENTION

According to one aspect of the invention, a photonic circuit is provided, comprising:

- a first waveguide on a silicon substrate, said waveguide having a thickness of 1-12 μm and a refractive index of 3-3.5;
- an second waveguide comprising amorphous silicon and having a thickness of 0.1-1 and a refractive index of 3.1-4, said waveguide having a tapered shape with a cross-section that is smaller at one end and larger at the opposite end at least in one direction;
- at least one layer of an optical material arranged to optically interface with said second
- waveguide, said layer comprising a photonic device; wherein
- said end of said tapered second waveguide having a smaller cross-section is interfaced with said first waveguide to provide adiabatic light transfer between said first and second waveguides, and wherein said photonic device is interfaced with said end of said second waveguide having a larger cross-section to provide optical coupling between said second waveguide and said photonic device.

The invention thus concerns a light escalator concept, where the light is moved from a thick initial HIC waveguide (e.g. made of Si) to a thin HIC waveguide deposited on top and which is made of a low-loss material with higher refractive index than normal silicon, e.g. a-Si:H alloy. The thin waveguide it at one end coupled to a device that may be made of a different material and is deposited or otherwise added on top of the thick HIC waveguide.

Within the inventive concept, various refractive index ranges and waveguide size ranges may be specified for the initial (e.g. Si) and the final (e.g. a-Si:H) waveguide.

According to further aspects of the invention, photonic circuits, such as an inventive light detector circuit comprises:
- a first waveguide on a silicon substrate, said waveguide having a thickness of 1-12 μm and a refractive index of 3-3.5;
- an etch-stop layer on said first waveguide;
- at least one second waveguide deposited on said first waveguide and said etch-stop layer comprising amorphous silicon and having a thickness of 0.1-1 μm and a refractive index of 3.1-4, said second waveguide having a tapered cross-section that is smaller at one end and larger at the opposite end at least in one direction;
- a layer of germanium deposited on said first waveguide adjacent to or partially overlapping with said at least one second waveguide, said germanium layer comprising a light detector; wherein
- said light detector is interfaced with said end of said tapered second waveguide having a larger cross-section to provide an optical coupling, and the opposite end of said tapered second waveguide having a smaller cross-section is interfaced on top of said first waveguide to provide adiabatic light transfer between said first and second waveguides.

Further, according to some embodiments, an inventive modulator circuit may comprise:
- a first waveguide on a silicon substrate, said waveguide having a thickness of 1-12 μm and a refractive index of 3-3.5;
- an etch-stop layer on said first waveguide;
- two layers of graphene deposited on said first waveguide and said etch-stop layer,
- a layer of a dielectric material deposited on each layer of graphene, said graphene and dielectric layers comprising a modulator;
- at least one second waveguide deposited on the uppermost dielectric layer comprising amorphous silicon and having a thickness of 0.1-1 μm and a refractive index of 3.1-4, said second waveguide having a tapered cross-section that is smaller at one end and larger at the opposite end at least in one direction; wherein
- said modulator is interfaced between said first and second waveguides to provide an optical coupling to said second waveguide, and said end of said tapered second waveguide having a smaller cross-section is interfaced on top of said first waveguide to provide adiabatic light transfer between said first and second waveguides.

An inventive modulator may be interfaced between said first and second waveguides to provide an optical coupling to the thinner second waveguide, and the tapered end of the thin waveguide having a smaller cross-section is interfaced on top of the thick waveguide to provide adiabatic light transfer between the first and second waveguides.

Both the thick and the thin waveguide are high index contrast (HIC) waveguides with the refractive index of the core being at least 1 refractive index unit larger than the refractive index of the surrounding cladding materials (excluding the other waveguide core and photonic device materials). The thick waveguide can be made of crystalline silicon, for example. Underneath the thin second waveguide, the thick first waveguide is horizontally patterned into a horizontally confined waveguide. The thin waveguide can be made of a material comprising amorphous silicon.

According to some embodiments, the second waveguide is deposited on the first waveguide to partially overlap the photonic device. The material having a second refractive index may be amorphous silicon or hydrogenated amorphous silicon, which is partially overlapping an optical material, such as graphene.

According to some embodiments, the second waveguide acts as an intermediate waveguide, through which light is coupled into a third waveguide that is placed on top of the second waveguide. In this case light is adiabatically coupled from the second waveguide to the third waveguide, which forms the optical device. The third waveguide can be formed, for example, in a 200-500 nm thick layer of crystalline silicon or in a layer of III-V compound semiconductor material added on top of the second waveguide.

In some embodiments of the invention, the first waveguide is covered with an etch-stop layer prior to depositing the second waveguide and/or said at least one layer of an optical material.

In some embodiments of the invention, the first waveguide is a strip waveguide made of crystalline silicon. In some embodiments of the invention, the second waveguide is made of amorphous silicon or hydrogenated amorphous silicon. The exact properties of the material naturally depend on the concentrations of any participating materials, such as germanium.

In some embodiments, the dielectric material may comprise aluminum oxide, silicon nitride or silicon dioxide, for example. The etch-stop layer may comprise silica, silicon nitride or thermally oxidized silicon dioxide $SiO_2$, and the dielectric material comprise aluminum oxide, silicon nitride or silicon dioxide.

According to some embodiments of the invention, the optical material of the photonic device may comprise at least one layer of graphene, germanium or a silicon-germanium alloy.

In some embodiments of the invention, the contact to the layers of said at least one optical material layers are formed through etched openings in the dielectric material layers to enable contact to contact terminals patterned on the optical waveguide.

According to some embodiments, the thinner second waveguide is formed to a tapered shape having a cross-section in the horizontal plane of said substrate which is smaller at one end and larger at an opposite end of said tapered waveguide. In other embodiments, the second waveguide is formed to a tapered shape having a cross-section in the vertical plane of the substrate, which is smaller at one end and larger at an opposite end of said tapered waveguide. Obviously, the invention is not restricted to tapered shapes only, as long as the cross section is smaller at one end and larger at the opposite end.

The invention offers considerable benefits. In the case of detectors only a thin layer of Ge is needed, instead of the 3 μm thick Ge layer usually needed to make a detector on a 3 μm thick SOI. In this way the detector volume can be small and capacitance of vertical contacts can be low, paving the way to high speed devices. Also, unlike a 3 μm thick germanium layer grown on etched silicon, in the present invention Ge may be grown on high quality non-etched silicon surface, which makes the quality of the material much higher, with positive impact on sensitivity and dark current. Further, contacts for the devices can be implanted directly on flat a thick silicon surface. Similarly, a thin layer of SiGe alloy with suitable bandgap can be deposited to realize fast Franz-Keldysh modulators with smaller volume than existing devices in microscale silicon platforms. 2D materials, such as graphene, can be easily integrated and sandwiched between waveguides of amorphous and crystalline silicon, with suitable dielectric insulating layers.

Photonic circuits built according to the present invention are potentially much faster than present modulators based on thick SOI waveguides.

The inventive technology may be used and applied in monolithic integration of thin and thick waveguides, i.e. the possibility to fabricate thick and thin waveguides within the same fabrication process, making available a platform with the advantages of both types of waveguides. Integrated optics is an enabling technology, with a long list of possible applications, from integrated optical modulators and photo-detectors for high speed optical switching in telecommunications data centres to gas sensing, and from medical imaging to LIDAR systems.

Definitions

SOI—Silicon On Insulator
a-Si—Amorphous silicon
a-Si:H—Hydrogenated amorphous silicon
poly-Si—Polycrystalline silicon
a-SiGe:H—amorphous silicon-germanium
SiGe—silicon-germanium alloy
Franz-Keldysh modulator—an electro-absorption modulator for controlling the intensity of a laser light via an electric voltage based on the Franz-Keldysh effect, i.e. a change in the absorption spectrum caused by an applied electric field changes the bandgap energy optical material—a material consisting of, for example, graphene, germanium or a silicon-germanium alloy, which can be optically active, i.e. form a controllable photonic device, i.e. a modulator thick waveguide—a waveguide having a thickness of 1-12 µm, and a refractive index in the range of 3-3.5. The waveguide may consist of, for example, crystalline silicon, indium phosphide, gallium arsenide, or any other high-refractive index transparent material that receives input light from one direction and may feed an optical waveguide with that light in another direction. The material may be designed to be a waveguide in itself.

thin waveguide—a submicron scale low-loss waveguide having a thickness of 0.1-1 µm and a refractive index in the range of 3.1-4. The waveguide consists of amorphous silicon or hydrogenated amorphous silicon.

BRIEF DESCRIPTION OF THE DRAWINGS

FIGS. 7A and 7B shows a further embodiment of high index contrast waveguides with a silica bottom cladding.

FIG. 8 In shows the path of a light beam passing through an inventive device like one in FIG. 7A or 7B.

DESCRIPTION OF EMBODIMENTS

Figure 1:
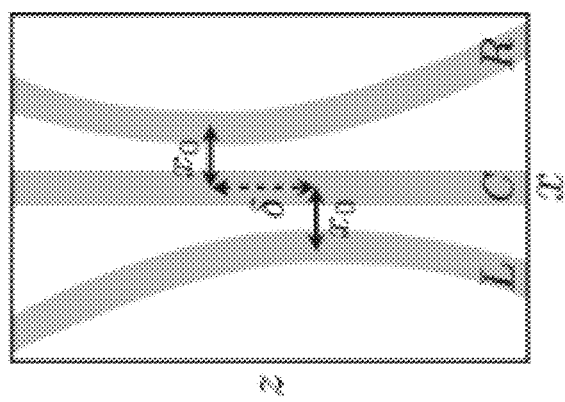
FIG. 1 illustrates the phenomenon of adiabatic light transfer.

FIG. 1 illustrate the phenomenon of adiabatic light transfer. In FIG. 1 is shown a schematic top view a system of three waveguides consisting of two circularly bent outermost waveguides L and R, and one straight central waveguide C. The minimum distance between waveguides is given by $x_0$, and the z distance between the centers of the curved waveguides is defined by $\delta$. The radius of curvature of the outermost waveguides L, R may be is 3.5 m, the spatial delay $\delta$=4200 µm, for example, and the minimum separation between waveguides $x_0$=7 µm, for example.

Figure 2:
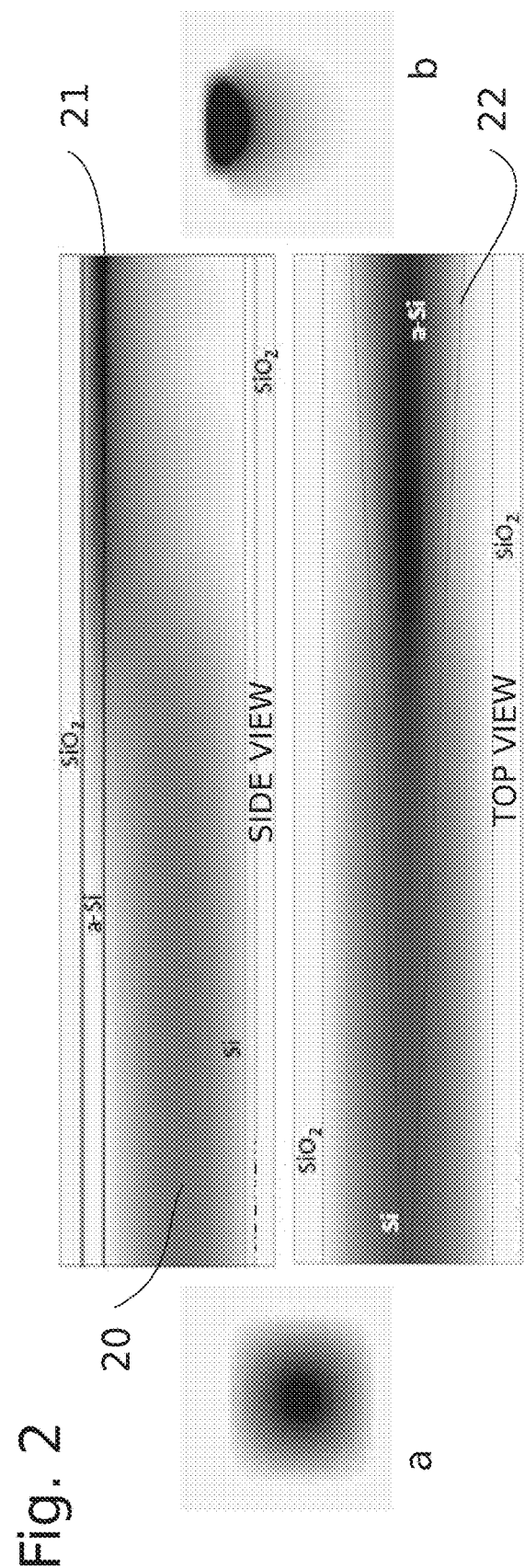
FIG. 2 shows in a side view and a top view the light transfer in an exemplary inventive waveguide.

FIG. 2 shows a side view and a top view of an exemplary inventive waveguide, where a simulation shows how the light is transferred from a lower thick silicon waveguide 20 made of crystalline silicon Si to an upper tapered (22) and thin hydrogenated amorphous silicon (a-Si:H) waveguide 21, with a refractive index higher than that of crystalline silicon. The cross-section "a" to the left further illustrate the light distribution at the left end of the waveguide and the cross-section "b" to the right the same situation at the right end.

Figure 3A:
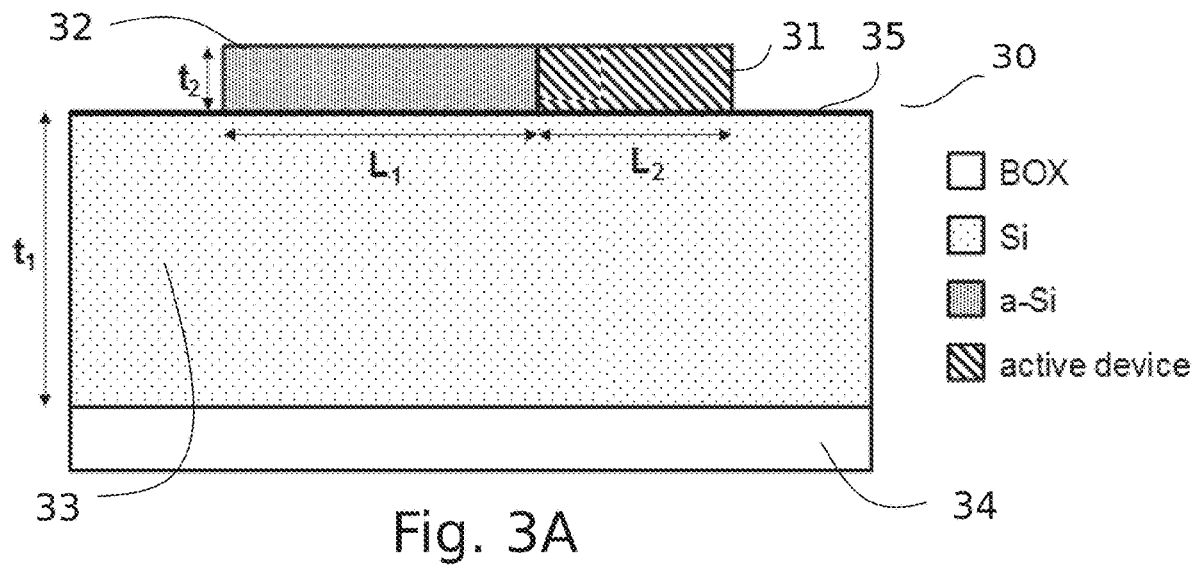
FIGS. 3A and 3B shows side and top views of a photonic device according to one embodiment of the invention.
Figure 3B:
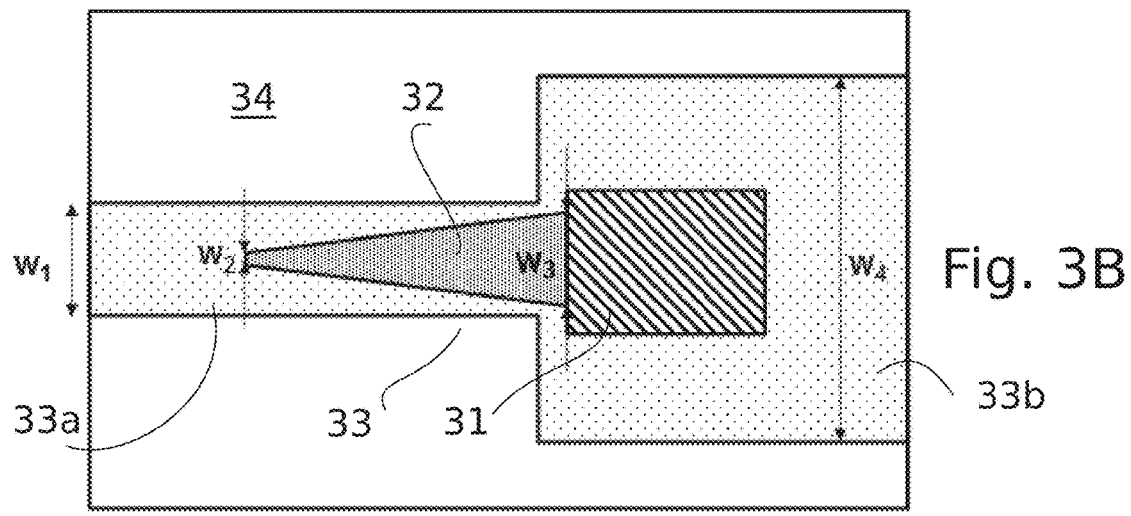

FIGS. 3A and 3B show an inventive photonic device 30 comprising a thin submicron ($t_2$=about 500 nm thick, for example) low-loss waveguide made of a hydrogenated amorphous silicon (a-Si:H) layer 32 having a refractive index higher than that of crystalline silicon. The waveguide 32 is deposited on top of a thick Si strip waveguide 33a, which may be covered by a very thin (about 10 nm, for example) etch-stop layer 35 made of silica or silicon nitride, for example. As shown in FIG. 3B, the a-Si:H layer 32 is etched into a waveguide with tapered width $W_2$, to adiabatically transfer the light from the thick Si waveguide 33a to the thin a-Si waveguide 32, located mainly on top of the Si waveguide portion 33a. The bottom layer 34 is an insulating part of a silicon substrate for the waveguide, and is here an SOI buried oxide (BOX) layer. The BOX layer 34 has a lower refractive index and a thickness that will optically separate the waveguide from a higher-index silicon substrate (not shown), located underneath the BOX layer.

The wide end of the tapered a-Si waveguide 32, having a width of $W_3$, is butt-coupled to an optical material that comprises a photonic active device 31 deposited at the same height as the waveguide 32 and having a comparable submicron thickness $t_2$. The joint and the device 31 is also shown in FIG. 3B. The device 31 may be located on the Si layer 33, which forms a silicon substrate and bottom cladding 33b for the device 31.

The device 31 can in some embodiments be made of the very same amorphous silicon material as waveguide 32, e.g. as a pn-implanted waveguide for phase modulation. In other embodiments of the invention, it may be a waveguide grown on top of a 2-dimensional (2D) material like graphene, for example. In further embodiments, the material may be a high refractive index material like germanium (Ge) and the device may then be used as a detector, for example, or a SiGe alloy in a Franz-Keldysh modulator, for example.

The different widths $W_2$ and $W_3$ as a result from a tapered shape of the waveguide in the horizontal plane of the silicon substrate 34 are not the only way to increase the cross-section of a thin waveguide 32. Alternatively, the shape may be tapered in the vertical plane. The critical feature for the waveguide is to have is to have a smaller volume in the area where the light enters the waveguide and a bigger volume in the exit area. The shape of the waveguide may be selected according to various design criteria, and it need not to be linear and/or planar, i.e. tapered as shown. Alternatively, the waveguide cross-sections could be kept constant, whereas the refractive indexes within a waveguide may vary, i.e. having a refractive index gradient, to achieve similar adiabatic light transfer. Clearly a combination of waveguide cross-section change and refractive index change can be also used. The general criterion to efficiently move the light from one waveguide to the other is to adiabatically change from a condition where the effective index of the mode of the thick waveguide ($n_{\textit{eff1}}$) is significantly higher than that of the second waveguide ($n_{\textit{eff2}}$), to a condition where the opposite is true ($n_{\textit{eff2}} > n_{\textit{eff1}}$). This can be achieved by playing with the waveguide geometry (smaller waveguide corresponding to lower effective index) and/or with the material refractive index.

Figure 4A:
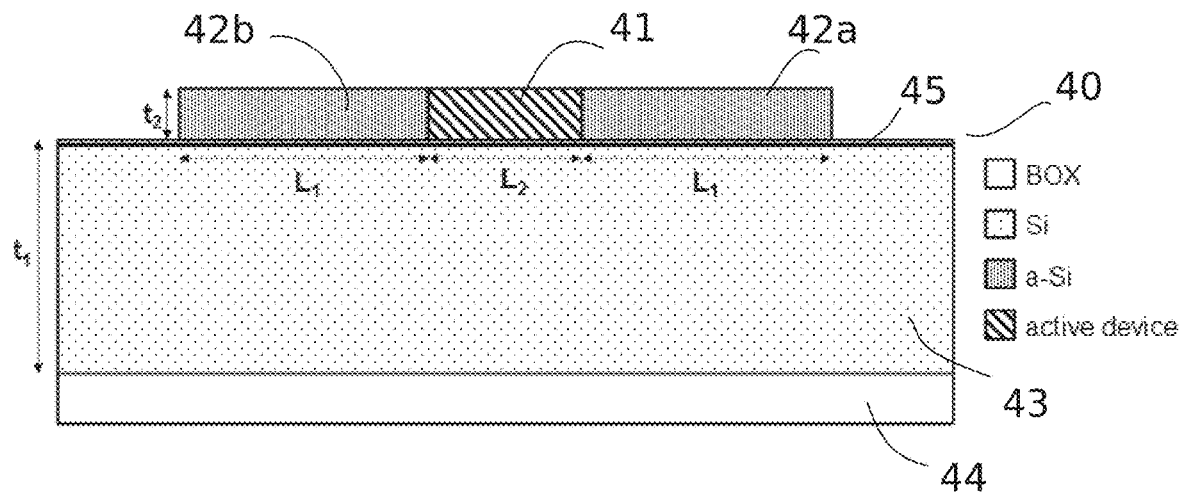
FIGS. 4A and 4B shows side and top views of a photonic device according to another embodiment of the invention.
Figure 4B:
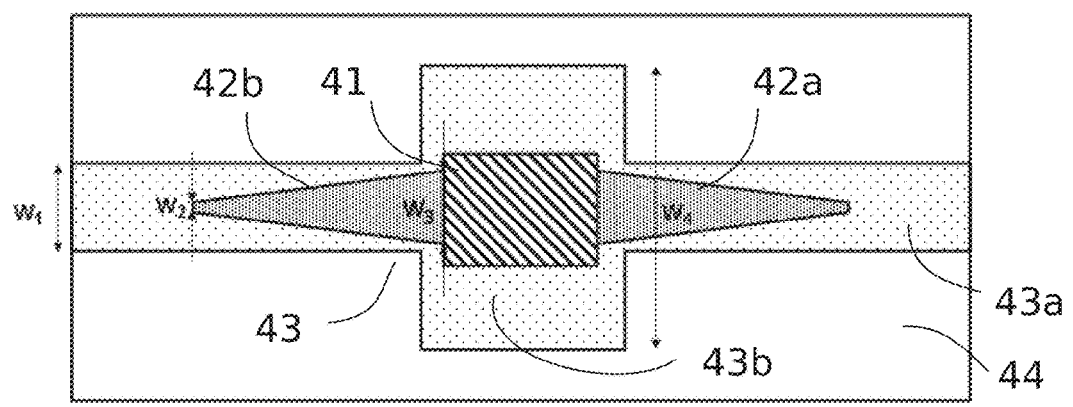

Depending on the type of device, the device can be either coupled back to a further silicon waveguide 43 through a second a-Si taper as shown in FIGS. 4A and 4B, e.g. for modulation, or it can be just terminated as in FIGS. 3A and 3B, e.g. for Ge detectors. The high refractive index layer 32 may consist of hydrogenated amorphous silicon (a-Si:H), or of any transparent material with refractive index higher than that of silicon, e.g. a SiGe alloy.

In FIGS. 4A and 4B are shown a similar, but double-ended device inventive photonic device 40 as in FIGS. 3A and 3B, with thin double tapered waveguide 42a and 42b on each side of an optically active material comprising a photonic active device 41, all deposited on a silicon waveguide 43a, and the etch-stop layer 45. As in FIGS. 3A and 3B, the device 41 is located on an extension of a generic thick Si substrate 43, forming a silicon substrate and bottom cladding 43b for the device 41. Also a BOX layer 44 is implied.

Figure 5A:
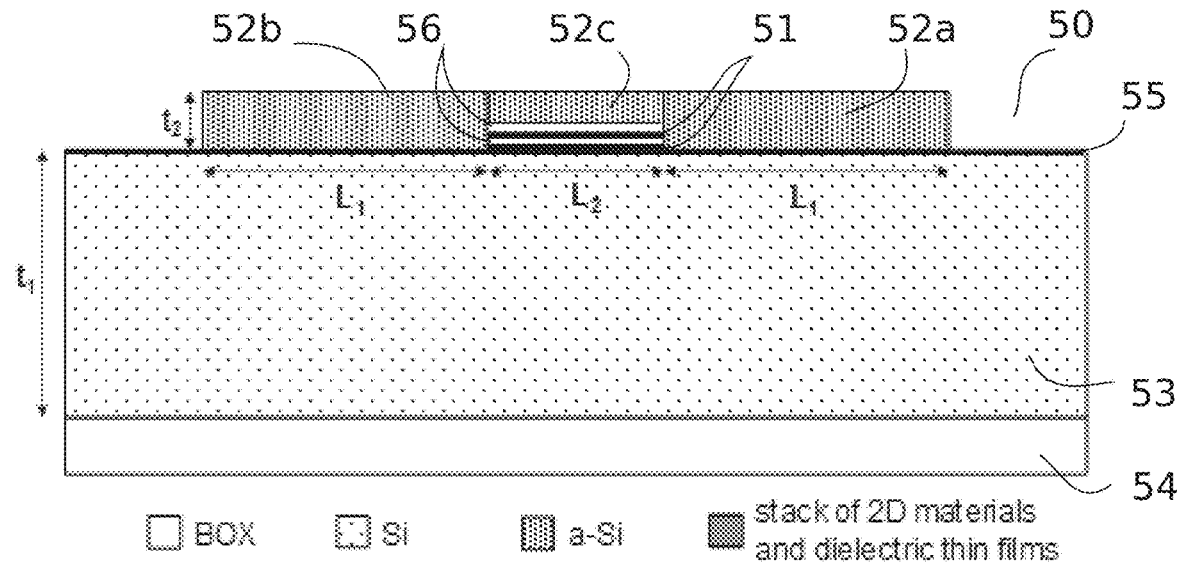
FIGS. 5A and 5B shows side and top views of a photonic device according to a further embodiment of the invention.
Figure 5B:
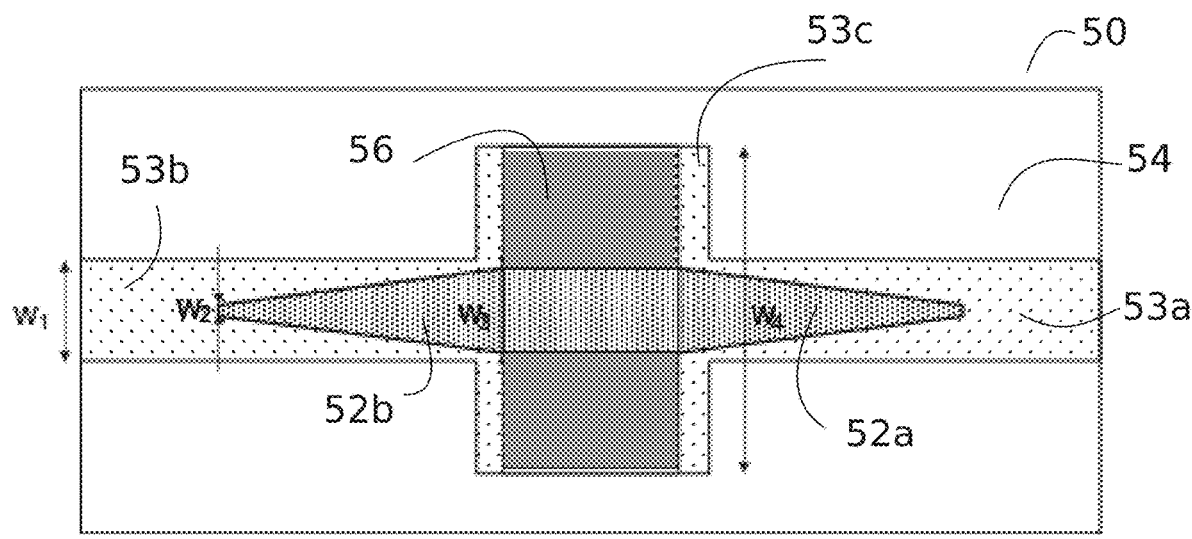

In FIGS. 5A and 5B is shown an embodiment of the present invention, where a photonic circuit 50 has layers 51 of an optical 2D material, like graphene for example, which with intervening dielectric layers 55, 56 constitute an optically active photonic device. The submicron hydrogenated amorphous silicon (a-Si:H) waveguide layer consists in this embodiment of three waveguide portions 52a-52c deposited on top of a thick Si strip waveguide 53, having three portions 53a-53c. Two thin waveguide portions 52a and 52b are tapered and deposited on the thick silicon waveguides 53a, 53b, as explained in connection with FIGS. 4A-4B. The third and central thin waveguide portion 52c is formed as a square on top of the photonic active device 51, 56 and a silicon cladding waveguide portion 53c.

An advantageous feature of the configuration shown in FIGS. 5A-5B is that the optically active photonic device may be deposited on the silicon waveguide 53a-53c prior to the deposition of layer 52a-52c, consisting of amorphous silicon for example. Thus the optical device 51, 56 becomes embedded inside the optical mode, which enables an easy and large overlap of the top waveguide 52a-52c compared to standard approaches, where the mode graphene interacts mainly or only with the evanescent tail of the optical mode, see FIGS. 3A and 4A.

FIG. 5A shows for example how a bilayer 51 of graphene can be embedded in the thin waveguide 52c, sandwiched between three dielectric thin films 55 and 56, consisting of e.g. $SiO_2$, $Si_3N_4$, or $Al_2O_3$. The large overlap with the graphene bilayer is obtained thanks to the relatively low index contrast between amorphous and crystalline silicon.

In some embodiments, the waveguide 52a-52c may be deposited on the thick waveguide portion 53c so as to wholly or partially overlap any photonic device, as shown best in FIG. 5B, which photonic device may have a layered structure as described above, or not. A BOX layer 54 is also implied, see discussion above.

Figures 6A, 6B:
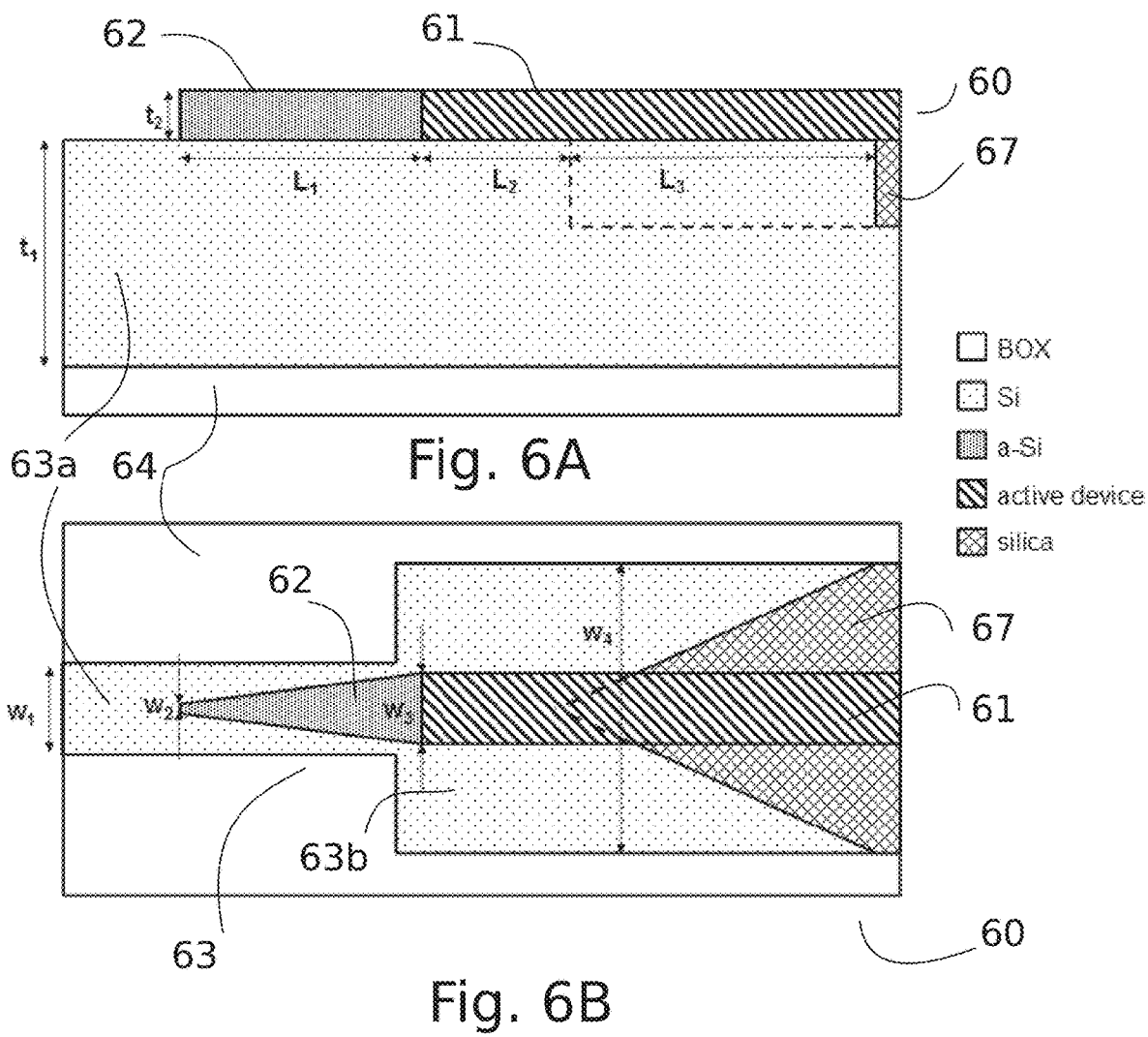
FIGS. 6A and 6B shows an embodiment of the invention with high index contrast waveguides with a silica bottom cladding.

In some embodiments, a high index contrast between amorphous and crystalline silicon is wanted, for example when bends with micron-scale bending radii are used to build micro-ring resonators with a free-spectral range as large as possible. FIGS. 6A and 6B shows an inventive photonic device 60 with high index contrast thin waveguides 61, 62 located on a thick silicon waveguide 63a and the cladding extension 63b of the Si substrate 63, respectively.

The waveguide 61 has a silica bottom cladding 67 formed in the cladding 63b by selectively etching silicon away, and replace it with silica 67. In this region the submicron waveguide 61 will deposit direct on top of the silica cladding which leads to a high index contrast waveguide suitable for tight bends.

Taken further, as shown in FIGS. 7A and 7B, it is possible to couple light into photonic circuits 78 fabricated on SOI wafers with submicron silicon layer that are bonded directly onto an inventive photonic circuit 70 on top of a thin amorphous silicon waveguide 72a-72c, having a silica bottom cladding 77. In this fashion, two different device platforms may be coupled at and around the marked area 71 through a suitable combination of inverse tapers. Thus, light can be coupled back and forth between devices with thick SOI waveguides 73a and devices 78 that are based on standard submicron silicon waveguide technologies. A silicon substrate and cladding portion 73b and BOX layers 74 are also indicated.

In FIG. 8 is shown a light beam 85 entering an inventive device 80, like the one in FIGS. 7A and 7B. The light 85 enters at one end of a thick SOI waveguide 83a at arrow A. As have been described in connection with FIG. 2, the light escalates through adiabatic transfer from the thick waveguide 83a to the thin waveguide 82c, because, when wide enough, the effective refractive index of the thin upper waveguide 82c becomes sufficiently high to effect the adiabatic light transfer. The light 85 proceeds in the waveguide 82c-82a, until it again escalates to a photonic circuit 88 in the area 81, which corresponds to the area 71 in FIG. 7B. As in FIG. 7B, a silicon substrate and cladding portion 83b and a BOX layer 84 is also indicated.

In the reverse direction, from a photonic circuit to waveguides, modulated or otherwise processed light may be led out from the photonic circuit by optical coupling to a submicron waveguide, and further by adiabatic transfer to thicker micron-scale silicon-on-insulator (SOI) waveguides.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures or characteristics may be combined in any suitable manner in one or more embodiments. In the description numerous specific details are provided to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The invention claimed is:

1. A photonic circuit, comprising:
    a first waveguide on a silicon substrate, said first waveguide having a thickness of 1-12 μm and a refractive index of 3-3.5;
    a second waveguide comprising amorphous silicon and having a thickness of 0.1-1 μm and a refractive index of 3.1-4, said second waveguide having a tapered shape with a cross-section that is smaller at one end and larger at the opposite end at least in one direction; and
    a photonic device comprising:
        multiple layers of an optical material arranged to optically interface with said second waveguide;
        a layer of a dielectric material deposited on each of said multiple layers of said optical material;
    wherein said second waveguide is deposited at least partly on said first waveguide, and
    said end of said tapered second waveguide having a smaller cross-section is interfaced with said first waveguide to provide adiabatic light transfer between said first and second waveguides, and wherein said photonic device is interfaced with said end of said second waveguide having a larger cross-section to provide optical coupling between said second waveguide and said photonic device.

2. The photonic circuit according to claim 1, wherein said photonic device comprises:
    at least one layer of an optical material deposited on said first waveguide; and
    a layer of a dielectric material deposited on each layer of said optical material, wherein said second waveguide is deposited partly on the uppermost dielectric layer and partly on said first waveguide.

3. The photonic circuit according to claim 1, wherein the photonic circuit comprises an etch-stop layer between at least one of said first waveguide, said second waveguide and said at least one layer of said optical material.

4. The photonic circuit according to claim 1, wherein said first waveguide is a strip waveguide made of crystalline silicon.

5. The photonic circuit according to claim 1, wherein said second waveguide is a waveguide made of amorphous silicon or hydrogenated amorphous silicon.

6. The photonic circuit according to claim 1, wherein said etch-stop layer comprise silica, silicon nitride or thermally oxidized silicon dioxide $SiO_2$.

7. The photonic circuit according to claim 1, wherein said optical material comprises at least one layer of graphene, germanium or a silicon-germanium alloy.

8. The photonic circuit according to claim 1, wherein in the layers of said dielectric material is etched openings to provide electrical contact to the layers of said at least one of said optical material layers from contact terminals patterned on said second waveguide.

9. The photonic circuit according to claim 1, wherein said dielectric material comprises aluminum oxide, silicon nitride or silicon dioxide.

10. The photonic circuit according to claim 1, wherein said second waveguide is tapered in the horizontal plane of said substrate to provide cross-sections which is smaller at one end and larger at an opposite end.

11. The photonic circuit according to claim 1, wherein said second waveguide is tapered in the vertical plane of said substrate to provide cross-sections which is smaller at one end and larger at an opposite end.

12. A light detector circuit, comprising:
    a first waveguide on a silicon substrate, said first waveguide having a thickness of 1-12 μm and a refractive index of 3-3.5;
    an etch-stop layer on said first waveguide;
    a second waveguide deposited on said first waveguide and said etch-stop layer comprising amorphous silicon and having a thickness of 0.1-1 μm and a refractive index of 3.1-4, said second waveguide having a tapered cross-section that is smaller at one end and larger at the opposite end at least in one direction; and
    a photonic device comprising:
        multiple layers of an optical material arranged to optically interface with said second waveguide;
        a layer of a dielectric material deposited on each of said multiple layers of said optical material; and
        a layer of germanium deposited on said first waveguide adjacent to or partially overlapping with said at least one second waveguide, said germanium layer comprising a light detector; wherein
    said light detector is interfaced with said end of said tapered second waveguide having a larger cross-section to provide an optical coupling, and the opposite end of said tapered second waveguide having a smaller cross-section is interfaced on top of said first waveguide to provide adiabatic light transfer between said first and second waveguides.

13. The light detector circuit according to claim 12, wherein said first waveguide is a strip waveguide made of crystalline silicon.

14. The light detector circuit according to claim 12, wherein said second waveguide is a waveguide made of amorphous silicon or hydrogenated amorphous silicon.

15. The light detector circuit according to claim 12, wherein said etch-stop layer comprises silica, silicon nitride or thermally oxidized silicon dioxide $SiO_2$.

16. A modulator circuit, comprising:
- a first waveguide on a silicon substrate, said first waveguide having a thickness of 1-12 μm and a refractive index of 3-3.5;
- an etch-stop layer on said first waveguide;
- multiple layers of graphene deposited on said first waveguide and said etch-stop layer,
- a layer of a dielectric material deposited on each layer of said multiple layers of graphene, said graphene and dielectric layers comprising a modulator; and
- a second waveguide deposited on the uppermost dielectric layer comprising amorphous silicon and having a thickness of 0.1-1 μm and a refractive index of 3.1-4, said second waveguide having a tapered cross-section that is smaller at one end and larger at the opposite end at least in one direction; wherein said modulator is interfaced between said first and second waveguides to provide an optical coupling to said second waveguide, and said end of said tapered second waveguide having a smaller cross-section is interfaced on top of said first waveguide to provide adiabatic light transfer between said first and second waveguides.

17. The modulator circuit according to claim 16, wherein said first waveguide is a strip waveguide made of crystalline silicon.

18. The modulator circuit according to claim 16, wherein said second waveguide is a waveguide made of amorphous silicon or hydrogenated amorphous silicon.

19. The modulator circuit according to claim 16, wherein said etch-stop layer comprises silica, silicon nitride or thermally oxidized silicon dioxide $SiO_2$.

20. The modulator circuit according to claim 16, wherein said dielectric material comprises aluminum oxide, silicon nitride or silicon dioxide.

* * * * *